United States Patent [19]
Boileau

[11] 3,910,336
[45] Oct. 7, 1975

[54] WIDE RADIAL TIRE AND RIM THEREFOR

[75] Inventor: Jacques Boileau, Clermont-Ferrand, France

[73] Assignee: Compagnie Generale des Etablissements Michelin, Clermont-Ferrand, France

[22] Filed: Mar. 27, 1974

[21] Appl. No.: 455,506

[30] Foreign Application Priority Data
Apr. 9, 1973 France ............................ 73.12758

[52] U.S. Cl. ............. 152/379; 152/354; 152/362 R; 152/381; 301/5 R
[51] Int. Cl.² ...................... B60C 9/02; B60C 15/02
[58] Field of Search ........................... 152/354–359, 152/362 R, 362 CS, 379, 381; 301/5 R, 63 R, 63 DD

[56] References Cited
UNITED STATES PATENTS
| | | | |
|---|---|---|---|
| 2,992,671 | 7/1961 | Bracht | 152/362 R |
| 3,232,331 | 2/1966 | Cappa et al. | 152/354 |
| 3,486,547 | 12/1969 | Powers | 152/354 |
| 3,568,750 | 3/1971 | Henning | 152/354 |
| 3,722,568 | 3/1973 | Maiocchi | 152/362 CS |

*Primary Examiner*—Drayton E. Hoffman
*Attorney, Agent, or Firm*—Brumbaugh, Graves, Donohue & Raymond

[57] ABSTRACT

A radial or partially radial tire has a ratio H/B of height to breadth less than one and a carcass reinforcement having a neutral fiber that follows, at least between the midheight of the respective sidewalls and the respective bead rings, the natural equilibrium curve of a single-ply radial carcass that is without a tread reinforcement and that is subjected to internal pressure, the curve being tangent to the bead rings and passing through the edges of the tread reinforcement and through points where the sidewalls have a maximum distance from each other.

The wheel rim for mounting the tire is formed at each edge with a portion substantially parallel to the adjacent segment of the neutral fiber of the carcass reinforcement. This portion is connected to the adjoining bead seat by an S-shaped curve and is terminated on the outside by a curvature towards the axis of rotation of the tire.

12 Claims, 6 Drawing Figures

WIDE RADIAL TIRE AND RIM THEREFOR

BACKGROUND OF THE INVENTION

This invention relates to pneumatic tires and to the rims on which the tires are mounted, especially where the tires have a radial or partially radial carcass. Tires having a radial or partially radial carcass are referred to herein more simply as radial tires.

The reinforcement of radial tires comprises a tread reinforcement and a carcass reinforcement.

The tread reinforcement extends under the tread and belts the carcass reinforcement. It comprises at least two crossed plies of wires or cords which are inclined slightly with respect to the longitudinal direction of the tire. It stiffens the tread and forms an unstretchable belt around the carcass reinforcement.

The carcass reinforcement extends from one bead to the other. It can cooperate with the tread reinforcement in reinforcing the tread. By itself it ensures the reinforcement of the sidewalls and of the beads. For this purpose it has at least one ply of radial or partially radial wires or cords, called the carcass ply, and at least one bead ring per bead. This bead ring serves as anchoring for the carcass reinforcement in the beads. The latter are thus stiffened in the three principal directions (radial, axial, circumferential) by the bead ring and by the carcass reinforcement and its anchoring, with the assistance, possibly, of additional plies. This stiffening has the purpose of firmly connecting the tire with the rim and of ensuring an airtight seal in the case of tubeless tires.

The result is that it is the profile of the zone of the rim in contact with the bead that determines the profile, the inner structure, and the mechanical properties of the bead, and in particular the change in sign of the concavity of the carcass reinforcement near this zone. In practice, two bead-rim arrangements have found commercial acceptance.

The first of these arrangements, which is rather old, uses a rim with cylindrical or very slightly conical bead seats. These seats merge with flanges extending away from the wheel axis at an angle of 90° and terminating in an edge which is bent over towards the wheel axis. The fastening of the tire on the rim results essentially from the pushing on the axially outer face of the beads against the right-angled flange of the rim under the effect of the pressure prevailing within the tire.

The second of these arrangements, which is more recent and designed especially for tubeless tires, uses a rim with conical bead seats. These seats are generally inclined 15° with respect to the axis of the wheel. The fastening of the tire on the rim is produced primarily by the wedging of the beads on the conical seats of the rim under the effect of the internal pressure of the tire. This wedging at the same time produces an airtight seal for the pneumatic cavity. As to the outer edges of the rim flanges, they are reduced to simple hooks of small height as compared with the seats. The role of these hooks is merely to improve the axial holding of the beads and the positioning thereof on the seats.

These two frequently-used types of rims require beads that are rigid and reinforced extensively. On the one hand, the change in concavity of the carcass reinforcement at the place where the sidewalls join the beads predisposes the beads, if they are too flexible, towards leaving their seats. On the other hand, when rims having seats inclined by 15° are used, the wedging that results puts the bead rings to a severe test.

The beads and their reinforcements affect the functioning of the sidewalls, which are the elements primarily responsible for the flexibility of, and therefore the comfort provided by, the tire. The conventional structure described above does not detrimentally affect comfort as long as the sidewalls are of sufficient height. However, the design of modern vehicles requires continual improvements in the adherence, braking, and road behavior of tires. Thus, treads have been widened without an increase in the outside diameter of the tires and without a decrease, or even with an increase, in the diameter of the rim well. In some radial tires, the height H of the radial section when the tire is inflated but not under load is far less than the largest width B of the same cross section: that is, the ratio H/B is considerably less than one. This ratio may be less than 0.6 and even less than 0.5. In these tires the height reserved for the sidewalls becomes insufficient to provide comfort equivalent to that provided by traditional radial tires.

SUMMARY OF THE INVENTION

An object of the invention is to preserve and even to increase the comfort provided by radial tires having sidewalls of reduced height without detrimentally affecting the other properties of the tires and while ensuring, in particular, their proper tightness on the rim.

The foregoing and other objects of the invention are attained by a highly-effective combination of a tire and a rim, each of which is original.

Earlier proposals for dealing with the problem have not been employed commercially because of their complicated structure and unsatisfactory highway behavior (French Pat. No. 1,515,950, for instance).

In accordance with the present invention, a tire is provided having a ratio H/B less than one and comprising a carcass reinforcement which is radial or at least radial over the lower half of the height of the tire and extends from one bead to the other and a tread reinforcement preferably having reinforced edges; and a rim is provided having on either side of a rim base a bead seat which terminates in an edge that may or may not be followed by a hook. This invention is characterized in that (a) the neutral fiber of the carcass reinforcement, at least starting from the midheight of the sidewall and extending until it meets the bead rings, follows the natural equilibrium curve assumed by a single radial carcass ply under the effect of internal pressure, the curve being tangent to the bead rings and passing through the edges of the tread reinforcement, which is located at a height H with respect to the bead seats, and through the points where the sidewalls have a maximum distance B from each other and have a vertical tangent; and (b) the rim edge comprises a portion that is substantially parallel to the facing segment of the neutral fiber of the carcass reinforcement, that is connected by an S curve with the bead seat, and that is terminated on the outside by a curvature towards the axis of rotation of the tire and rim.

In accordance with the present invention the neutral fiber of a single carcass ply is by definition represented by the core of a wire or cord of the ply contained in a radial plane.

In a carcass having two plies the neutral fiber is by definition located half-way between the cores of two wires or cords contained in the same radial plane.

By similar averaging, the neutral fiber of a carcass having more than two plies can be located.

The equilibrium curve assumed by the neutral fiber of a radial carcass subjected to internal pressure is defined by the following formulas:

$$\rho = \frac{Rs^2 - Re^2}{2R} \qquad (1)$$

$$\lambda = \frac{Rs^2 - Re^2}{R + Re} \qquad (2)$$

The equilibrium curve, the meaning of the parameters of which will be given below, is defined by a loop whose axis of symmetry is the intersection of the median plane of the tire with the radial plane containing the loop. The loop meets the median axis at the crown and at a second point where the two branches of the loop intersect and then move away from each other. Rs is the distance from the axis of rotation of the tire to the crown point: i.e., the radius of the crown where the curve has a tangent perpendicular to the median axis. Between the crown point and the point of intersection of the two branches of the loop, each branch has a point where it has a tangent parallel to the median axis. These two points define the equator of the equilibrium curve and Re is their common distance to the axis of rotation of the tire. The largest width B of a radial section of the carcass of the tire according to the invention is located at the level of the equator of the equilibrium curve. If Re and Rs are fixed, formulas (1) and (2) make it possible to draw the equilibrium curve, it being understood that $\rho$ designates the radius of curvature of the curve at a point of any radius R (R being measured with respect to the tire axis, and $\lambda$ the length of the segment of the normal to the curve between the radius point R and the point where the normal intersects the equatorial straight line connecting the two equatorial points defined above.

As will be seen subsequently, the tire in accordance with the invention has a bead which is reduced to the utmost because the sidewall, instead of extending merely to the point of inflection of the carcass (i.e., to the point where the carcass curvature changes from convex to concave, as viewed from the outside), extends all the way to the point where the carcass becomes tangent to the bead ring. In other words, the point of inflection is shifted to the level of the bead ring itself.

The tire has a seat on the rim which is as stable as that of an ordinary tire on an ordinary rim because, in the zone of contact of the tire of the invention with the rim of the invention, the pressure of the bead against the rim is better distributed. This results in a more accurate centering of the tire on its rim, particularly in the case of a tubeless tire. It is therefore possible to decrease the conicity of the bead seats, so that the bead rings are subjected to less stress and can be made lighter. As a whole, the invention results in lighter and more flexible beads.

A computer is preferably used to calculate the trace of the neutral fiber of the carcass of a tire in accordance with the invention. The following limits are imposed:

the width of the rim, defined in the usual way by the axial distance between the points of intersection of the extension of each of the two seats with the tangent to the upper end of the curve which connects these seats to each of the rim edges;

the radius of the rim, defined in the usual way by the radial distance between the wheel axis and the point of intersection as defined above;

the width and the radius of the tread reinforcement, selected preferably with a curvature in a radial plane which is zero or at any rate less than its curvature in the circumferential direction;

the value of the ratio H/B from which the largest width B of the carcass can be calculated (H being equal to the difference between the radius of the tread reinforcement and the radius of the rim); and the position of the bead rings with respect to the tire seats and edges.

Finally, the equilibrium curve is caused to pass through the edges of the crown reinforcement and to be tangent to the bead rings and the two equatorial tangents. At the place where the theoretical curve intersects the edges of the tread reinforcement it generally forms an angle other than zero with the reinforcement. It is then advisable to effect a correction in the region of the shoulder. This correction involves connecting the calculated equilibrium curve with the tread reinforcement by a connecting arc. The latter, of course, is tangent to the equilibrium curve. The connecting arc is preferably also tangent to the tread reinforcement. However, the invention also comprises the case where the equilibrium curve is itself tangent to the tread reinforcement. The invention also extends to the case where reinforcing means intended to improve the road stability of the tire is combined with the carcass reinforcement. The invention provides those skilled in the art with a method of affecting the road stability within unusually wide limits by acting on the width of the rim without, however, violating an important principle of the invention, namely the tangency to the bead ring of the neutral fiber of the carcass. The increasing of the width of the rim places the carcass under greater tension and stiffens the tire in the axial direction. On the other hand, a decrease in the width of the rim results in a relaxation of the tension of the carcass and increase the flexibility of the tire in the axial direction.

The rim in accordance with the invention may have an ordinary radial profile up to and including the bead seats. The conical portion of the edge, parallel to the corresponding segment of the neutral fiber, may have any inclination less than 90° with respect to the tire axis. An inclination of between 20° and 60° and preferably close to 45° gives satisfactory results both with respect to the behavior of the tire and with respect to the manufacture of the rim. This portion of the edge preferably has a linear profile or a slightly arched profile, namely concave towards the tire like the corresponding segment of the neutral fiber of the carcass or convex, a slight convexity having not been found disturbing while it facilitates the manufacture of the rim. The outer wall of the tire is customarily in contact with the conical portion of the edge. There is thus no purpose in widening this portion in order merely to impart further rigidity to the rim. The axial width of this portion is preferably nearly the same as the diameter of the bead ring so as not to interfere with the flexing of the tire. Nevertheless, in the case of a carcass reinforcement that is not under much tension, i.e., that is very flexible and tangent to the bead ring at a relatively small angle with respect to the axis of rotation, the conical portion can be widened without disadvantage, for instance in order to remedy the lack of rigidity of the rim due to its narrowness. This improves the seating of the tire on the rim.

In accordance with the invention, the conical portion of the edge is connected to the bead seat by an S shaped curve, the branches of which may be of different lengths and curvatures. This connecting curve preferably has one branch tangent to the bead seat and the other branch tangent to the conical portion of the edge. The point of inflection common to the two branches is also preferably located radially at the level of the core of the bead ring, and the tangent to the connecting curve at this point is parallel to the median axis of the neutral fiber of the carcass.

The rim in accordance with the invention furthermore fits bead seats having a relatively small inclination, in any event less than 15°.

Towards the outside of the rim in an axial direction the conical portion of the edge is terminated by a curvature intended to strengthen it and avoid damaging the beads during the mounting of the tire. The outer end of the conical portion of the edge is preferably located above the bead ring. Seen from the outside in an axial direction, the bead ring is therefore preferably located within the outline of the edge assembly in accordance with the invention, that is to say, the structure outside the conical portion extends radially beyond the bead ring.

However, the edge, in accordance with the invention, is generally less high, seen in radial section, than a conventional rim edge. This facilitates the mounting of the tire and, in the case of a hollow-well rim, makes it possible to reduce the depth of the well and therefore to increase the space available for the braking members.

BRIEF DESCRIPTION OF THE DRAWING

The invention will be better understood by reference to the following detailed description of the preferred embodiments thereof, in conjunction with the appended figures of the drawing, wherein.

DESCRIPTION OF THE PREFERRED EMBODIMENTS

Figure 1:
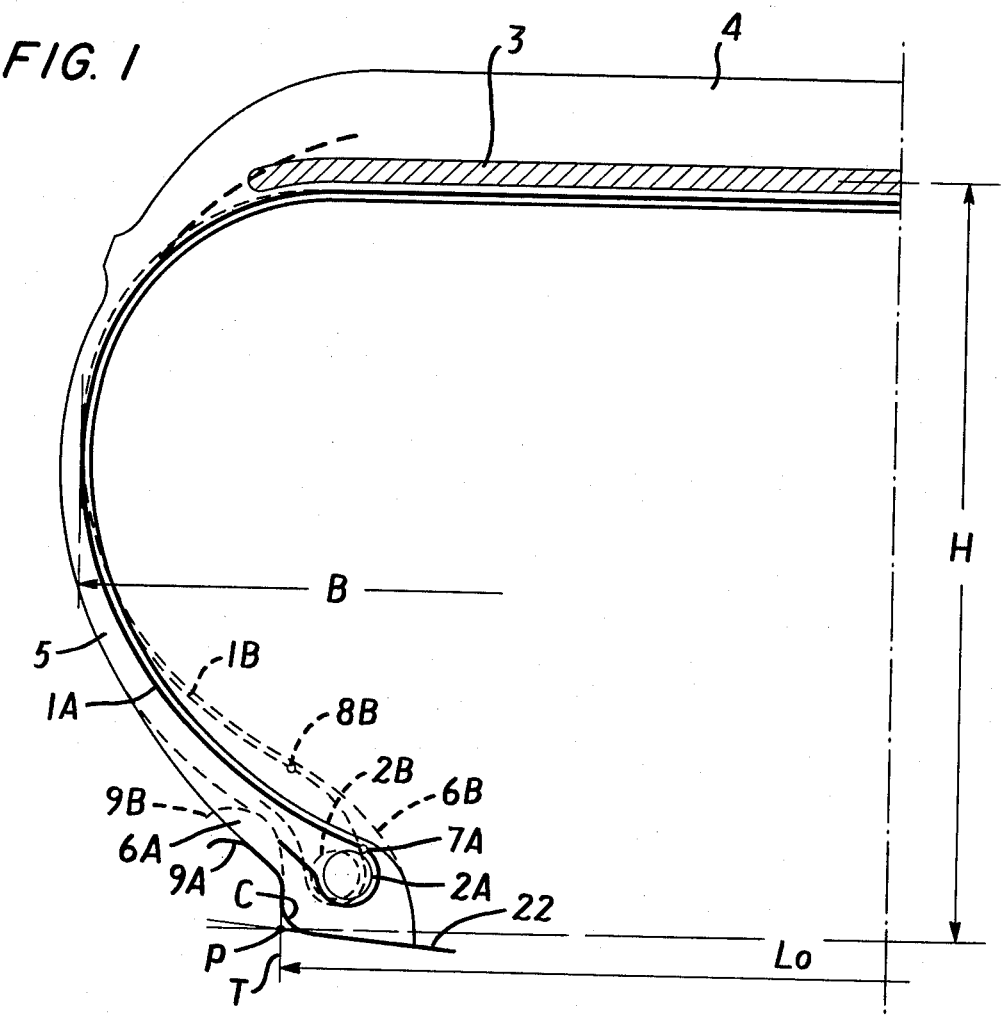
FIG. 1 is a schematic radial half section of a tire in accordance with the invention superimposed on a schematic radial half section in dashed outline of a conventional tire having the same ratio H:B.
Figure 2:
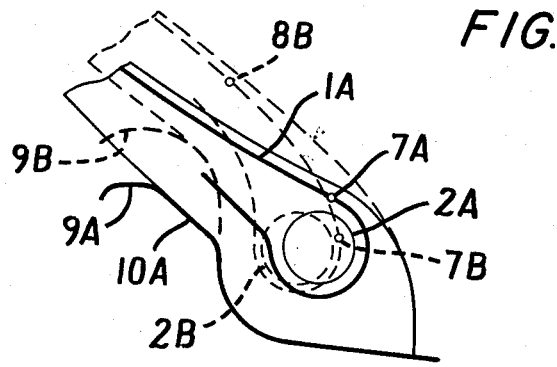
FIG. 2 shows the zone of the bead and of the rim edge of the two tires in accordance with FIG. 1, on a larger scale for greater clarity.

In FIGS. 1 and 2 the reference numbers generally have the suffix A in the case of a tire and/or rim in accordance with the invention and the suffix B in the case of a conventional tire and/or rim. In order to designate the elements common to the two tires and/or rims numbers without the addition of any letter have been employed. Furthermore, the elements in accordance with the invention have been shown in solid lines and the conventional elements in light dashed lines.

FIG. 1 shows one-half of a radial section of a tire in accordance with the invention and one-half of a radial section of an ordinary tire. Each of these tires has a radial carcass reinforcement indicated by its neutral fiber 1A, 1B, and a tread or crown reinforcement 3 on top of which is a tread 4.

The carcass reinforcement 1A, 1B is folded back around the bead ring 2A, 2B in the beads. It fits the profile of the tread reinforcement 3 which is identical for both tires. The reinforcement of these tires is completely covered with rubber and in particular by a tread 4, sidewall facings 5 and beads 6A, 6B.

In the bead, the carcass reinforcement 1A of the tire in accordance with the invention becomes, without changing concavity, tangent to the bead ring 2A at the point 7A and then winds around it. Beyond the point 7A following the average equilibrium curve defined previously, the carcass reinforcement 1A then joins the crown reinforcement 3. In the case of this figure, the average curve is corrected (in solid line) in the vicinity of the shoulder, so as to engage tangentially under the crown reinforcement 3, thus moving away from the average equilibrium curve shown in heavy dashed lines.

In the conventional tire, on the other hand, the carcass reinforcement 1B changes concavity at the point 8B approximately at the level of the top of the bead and then winds around the bead ring 2B. Beyond the point 7B where it touches the bead ring until it is engaged below the crown reinforcement 3, the carcass reinforcement 1B has an average curve which differs considerably from that of the tire in accordance with the invention, particularly in the lower portion of the sidewall of the tire.

The rims corresponding to these two tires have been shown in FIG. 1 only with respect to the outer contour 9A, 9B of the portion of the rims adjacent to and in contact with the beads 6A, 6B. These rim portions are different from each other towards the outside, starting from the bead seats. In particular, the edge 10A of the rim in accordance with the invention comprises an oblique portion which is substantially parallel to the facing or adjacent segment of the neutral fiber of the tire in accordance with the invention.

In FIG. 1 there have also been indicated the characteristic dimensions of the radial section of the tires in question, H being the height and B the width, while Lo indicates the width of the rim. This width Lo is represented by the axial distance between the points of intersection P of the extension of each of the two seats 22 with the tangent T to the upper end of the curve C which connects these seats to each of the rim edges.

A comparison between two tires of size DR 50–15 (according to the standards of the Tire and Rim Association), one corresponding to the conventional carcass and rim profiles and the other corresponding to the carcass and rim profiles in accordance with the invention, has given the following results:

| Load (daN) | Flattening (mm) | Conventional profile | | Profile in accordance with the invention | |
|---|---|---|---|---|---|
| | | Pressure (bar) | Transverse Stiffness (daN/mm) | Pressure (bar) | Transverse Stiffness (daN/mm) |
| 275 | 17 | 1.6 | 8.4 | 1.54 | 9.3 |
| 550 | 28 | 2.0 | 8.7 | 1.92 | 9.2 |

It is found that, for a given load and a given flattening in the area of the footprint, the tire in accordance with the invention has a lower inflation pressure and greater transverse stiffness than a conventional tire. It therefore exhibits substantially improved road behavior, particularly with respect to comfort, adherence and stability.

Figure 3:
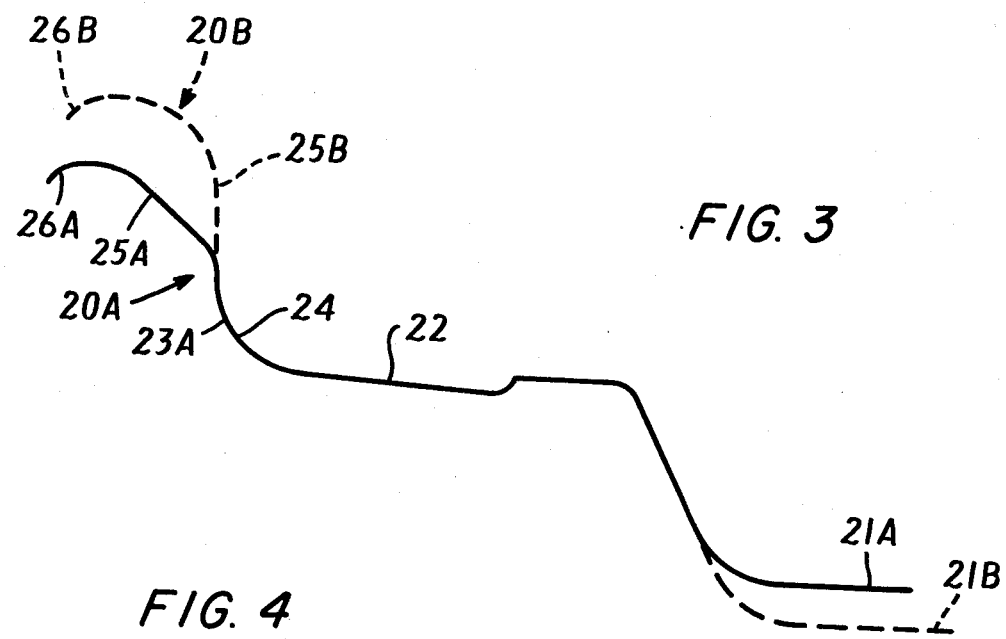
FIG. 3 shows the radial profile of a rim in accordance with the invention superimposed on the radial profile of a conventional rim (in dashed outline) having an edge raised 90°.

FIG. 3 is a detailed showing of a portion of the outer profiles 20A, 20B of a rim in accordance with the invention and an ordinary rim, such as are suitable for the tires shown in FIGS. 1 and 2.

The two profiles 20A and 20B differ on the one hand in the portions which are axially outside the bead seats 22 and on the other hand by the depth of the groove bottom 21A, 21B.

The rim of profile 20A in accordance with the invention has a seat 22 extended by a curve 23A having the shape of a letter s the branch of which contiguous with the seat 22 receives the heel of the bead of the tire (not shown) and the radially outer branch of which connects with the oblique portion 25A of the edge. This oblique portion 25A is terminated by a hook 26A. The profile 20A of the rim in accordance with the invention differs from profile 20B of the ordinary rim at least in the region extending outwardly from the rounded portion 24 intended to receive the heel of the bead. It may also differ therefrom starting from the bead seat 22 or even have a seat 22 which is different in its width and inclination. The profile 20B of the conventional rim has a portion 25B which is inclined 90° with respect to the axis of rotation, and then terminates in a hook 26B. The edge assembly 23A, 25A, 26A of the rim in accordance with the invention has a radial extent less than the edge 24, 25B, 26B of the ordinary rim. The reduced height of the edge of the rim in accordance with the invention and its special profile facilitate the mounting of the tire to such an extent that the diameter of the rim well 21A can be increased as compared with that of the well 21B of the conventional rim. The invention therefore makes possible an increase in the space available within the rim, where the brake is mounted.

Figure 4:
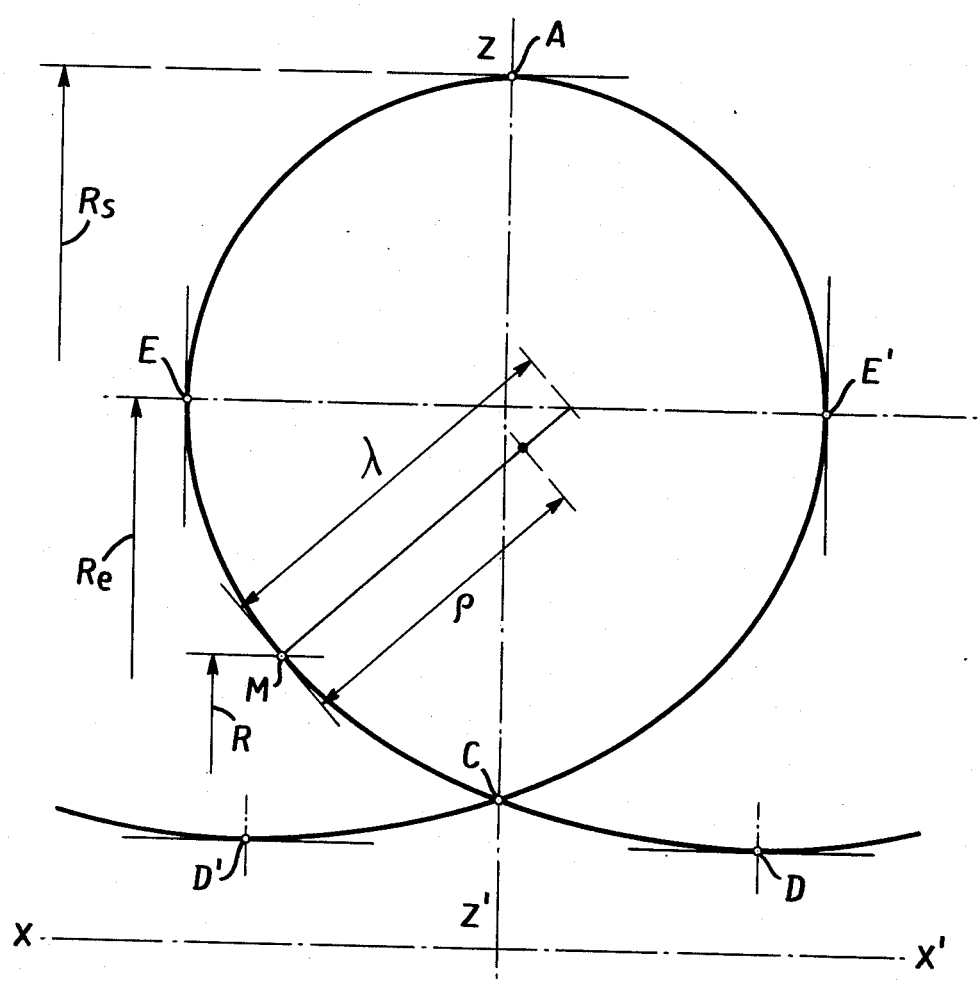
FIG. 4 shows the equilibrium curve of the neutral fiber of a radial carcass without crown reinforcement and subjected solely to the inflation pressure.

The course of the neutral fiber of a radial carcass which is subjected only to inflation pressure is shown in FIG. 4. In this figure there are shown the median axis Z—Z', the axis of rotation X—X' of the carcass, or, otherwise stated, of the tire, and the equatorial axis joining the two points E and E' where the carcass reaches its maximum width and has tangents parallel to the median axis Z—Z'. The equatorial axis E—' is itself parallel to the axis of rotation X—X'.

The two branches of the neutral fiber connect at the top A and intersect at the point C, these two points A and C being located on the median axis Z—Z'. At the top point A the two branches have a common tangent parallel to the axis of rotation X—X'. Furthermore, at the points D and D', respectively, each of the branches has another (and identical) tangent parallel to the axis of rotation X—X'.

In FIG. 4 there have also been shown the radii Re and Rs of the equatorial points E and E' and of the top point A. At any point M of the neutral fiber defined by formulas (1) and (2) given above, the neutral fiber has a radius of curvature $\rho$ defined by formula (1). The length of the segment normal to the tangent to the neutral fiber at the point M, measured between this point M and equatorial axis E—E', is equal to $\lambda$ as defined in formula (2).

Figure 5:
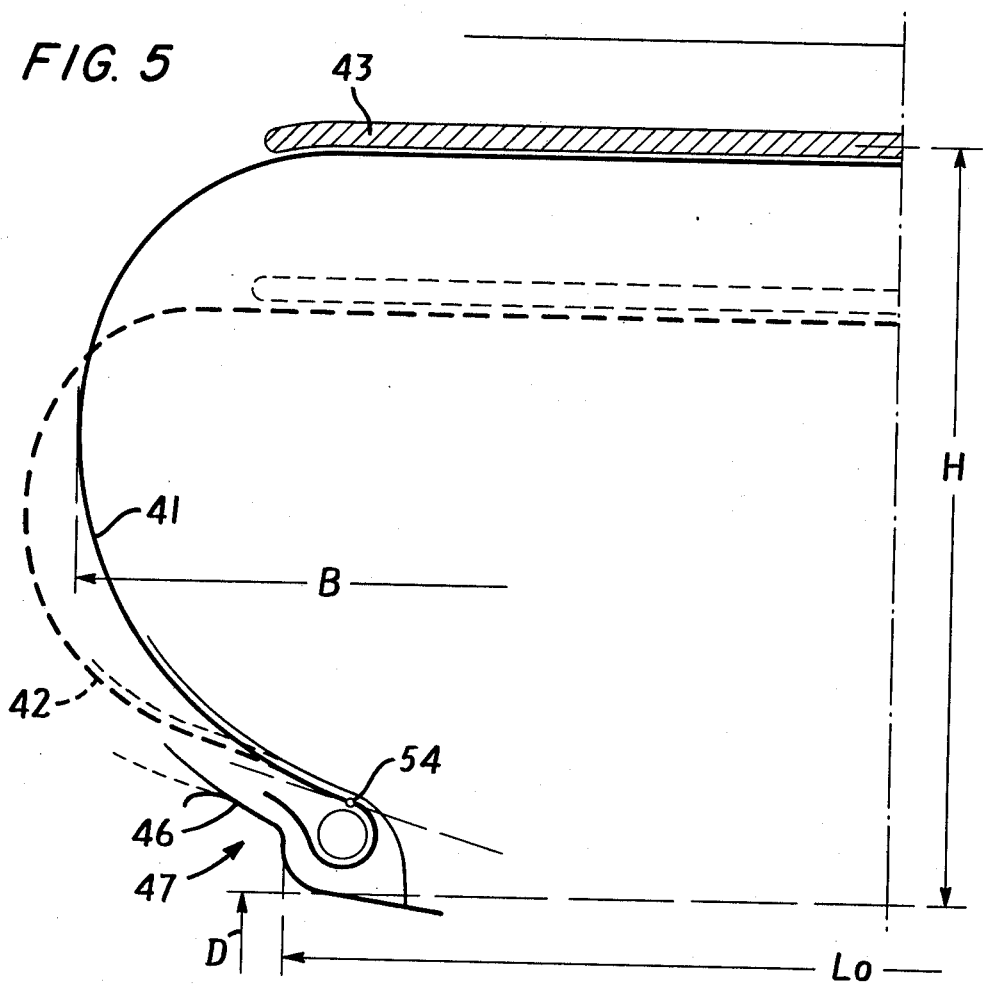
FIG. 5 shows the radial half section of an assembly comprising a rim and a tire in accordance with the invention, the tire being shown in inflated condition (in solid lines) and inflated but pressed against the ground under the effect of a load (in dashed lines)
Figure 6:
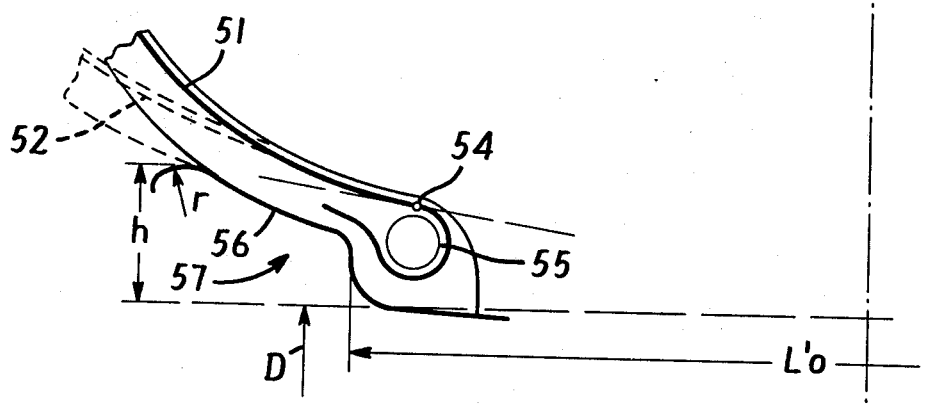
FIG. 6 shows an embodiment alternate to that shown in FIG. 5, the tire having the same dimensions H and B but a rim substantially narrower than that shown in FIG. 5, the drawing showing only one bead and one rim edge of this assembly.

FIGS. 5 and 6 illustrate two examples of tires made in accordance with the invention, one (FIG. 5) provided with a wide rim and the other (FIG. 6) provided with a narrower rim, both rims being in accordance with the invention. These two figures show the neutral fibers 41, 51 of the carcass of the tire inflated and mounted on a suitable rim, as well as the profile 42, 52 of this neutral fiber when the tire is under a load sufficient to reduce the height of the tire by 21% of the height H, as defined above. The two tires have the same height H, the same maximum carcass width B, the same rim diameter D and the same crown reinforcement 43 and are designed to carry the same load.

The two tires differ in the widths Lo (FIG. 5) and L'o (FIG. 6), L'o being smaller than Lo, of the rim on which they are intended to be mounted. There results from this difference of width of rim a reduction of transverse stiffness of the tire according to FIG. 6. Structurally this results in a larger developed length of the carcass 51 than of the carcass 41 and in a tangent to the point of contact 54 with the bead ring 55 which is less inclined in the case of FIG. 6 with respect to the axis of rotation. The tire of FIG. 6 thus profits from the broad latitude of design provided by the inention, particularly in the lower zone of the carcass.

FIG. 5 also shows that the portion 46 of the rim 47 parallel to the corresponding segment of the neutral fiber of the carcass is substantially linear. In FIG. 6, on the other hand, the corresponding portion has a concavity facing the inside of the tire. Moreover, the assembly of the edge 57 shown in FIG. 6 is larger than that of FIG. 5. This consolidates the rim the width L'o of which is reduced with respect to the corresponding width Lo of the tire of FIG. 5. In the case of these figures, a satisfactory value of the ratio $h/r$ of the height $h$ of the rim edge 47, 57 to the radius $r$ of the terminal curvature of the edge is between 1.5 and 2.5.

Thus there are provided in accordance with the invention a novel and highly-effective tire, rim, and tire-rim assembly. Those skilled in the art will understand that the invention includes embodiments in addition to the representative ones disclosed above and is as broad as the appended claims and their equivalents.

I claim:

1. A tire and rim assembly wherein the tire comprises a tread portion, a tread reinforcement in the tread portion, a pair of sidewalls respectively on opposite sides of the tread portion, a pair of beads respectively at the inner edges of the sidewalls, a pair of bead rings respectively in the beads, and a carcass reinforcement that is radial at least from the midheight of the respective sidewalls to the respective beads and extends from one bead to the other, the tire having a height H and a breadth B, the ratio H/B being less than one, and the carcass reinforcement having a neutral fiber that follows, at least between the midheight of the respective sidewalls and the locations where it meets the respective bead rings, the natural equilibrium curve of a single-ply radial carcass that is without a tread reinforcement and that is subjected to internal pressure, said curve being tangent to the bead rings and passing through the edges of the tread reinforcement and through equator points where the sidewalls have a maximum distance B from each other and wherein the rim comprises a base, a bead seat on either side of the base, and an edge on the outer side of each seat, each edge comprising a portion substantially parallel to the adjacent segment of said neutral fiber, said portion being connected to the adjoining bead seat by an S-shaped curve and being terminated on the outside by a curvature towards the axis of rotation of the tire.

2. A tire and rim assembly according to claim 1 wherein the neutral fiber of the carcass reinforcement of the tire, at a point located at a distance R from the axis of rotation, has a radius of curvature $\rho$ which satisfies the formula $$\rho = \frac{Rs^2 - Re^2}{2R},$$

where Rs is the distance from the axis of rotation of the tire to the point where the natural equilibrium curve has a tangent perpendicular to the median plane of the tire and Re is the distance from the axis of rotation of the tire to the points where the natural equilibrium curve has tangents parallel to the median plane of the tire.

3. A tire and rim assembly according to claim 1 wherein the carcass reinforcement is tangent to the tread reinforcement of the tire.

4. A tire and rim assembly according to claim 1 wherein the tension of the carcass reinforcement of the tire increases with increasing width of the rim.

5. A tire and rim assembly according to claim 1 wherein substantially parallel to the adjacent segment of the neutral fiber of the carcass reinforcement is conical and has an inclination towards the outside less than 90° with respect to the axis of rotation.

6. A tire and rim assembly according to claim 5 wherein the inclination is between 20° and 60°

7. A tire and rim assembly according to claim 5 wherein the inclination is about 45°

8. A tire and rim assembly according to claim 5 wherein the conical portion has a linear profile.

9. A tire and rim assembly according to claim 5 wherein the conical portion has a slightly curved profile.

10. A tire and rim assembly according to claim 5 wherein the conical portion has an axial width substantially equal to the diameter of the bead ring.

11. A tire and rim assembly according to claim 5 wherein the edge of the rim extends radially beyond the bead ring.

12. A tire and rim assembly wherein the tire comprises a tread portion, a tread reinforcement in the tread portion, a pair of sidewalls respectively on opposite sides of the tread portion, a pair of beads respectively at the inner edges of the sidewalls, a pair of bead rings respectively in the beads, and a carcass reinforcement that is radial at least from the midheight of the respective sidewalls to the respective beads and extends from one bead to the other, the tire having a height H and a breadth B, the ratio H/B being less than one, and the carcass reinforcement having a neutral fiber that follows, at least between the midheight of the respective sidewalls and the respective bead rings, the natural equilibrium curve of a single-ply radial carcass that is without a tread reinforcement and that is subjected to internal pressure, said curve being tangent to the bead rings and passing through the edges of the tread reinforcement and through equator points where the sidewalls have a maximum distance B from each other and wherein the rim comprises a base, a bead seat on either side of the base, and an edge on the outer side of each seat, each edge comprising a portion substantially parallel to the adjacent segment of the neutral fiber of the carcass reinforcement, said portion being connected to the adjoining bead seat by an S-shaped curve and being terminated on the outside by a curvature towards the axis of rotation of the tire, said portion furthermore being conical and having an inclination towards the outside less than 90° with respect to the axis of rotation, and the S-shaped curve connecting the conical portion of the edge of the rim to the bead seat having one branch tangent to the bead seat and one branch tangent to said conical portion, the point of inflection common to the two branches being located radially at the level of the core of the bead ring and the tangent to the S-shaped curve at said point of inflection being parallel to the median plane of the neutral fiber of the carcass of the tire.

* * * * *

UNITED STATES PATENT AND TRADEMARK OFFICE
CERTIFICATE OF CORRECTION

PATENT NO. : 3,910,336
DATED : October 7, 1975
INVENTOR(S) : Jacques Boileau

It is certified that error appears in the above-identified patent and that said Letters Patent are hereby corrected as shown below:

Column 1, line 46, "on" should read --of--; Column 4, lines 44 and 45, "increase" should read --increases--; Column 7, line 25, after "portions" insert --thereof--; Column 7, line 30, "s" should read --S--; Column 7, line 61, "E--'" should read --E--E'--; Column 8, line 36, "inention" should read --invention--; Column 9, line 41, after "wherein" insert --said portion--; Column 9, line 44, "90°with" should read --90° with--; Column 9, line 46, "20°and" should read --20° and-- and after "60°" a period should be inserted; and Column 9, line 48, after "45°" insert a period.

Signed and Sealed this tenth Day of February 1976

[SEAL]

Attest:

RUTH C. MASON
Attesting Officer

C. MARSHALL DANN
Commissioner of Patents and Trademarks